(12) United States Patent
Isozu et al.

(10) Patent No.: US 8,584,007 B2
(45) Date of Patent: Nov. 12, 2013

(54) INFORMATION PROCESSING METHOD, INFORMATION PROCESSING APPARATUS, AND PROGRAM

(75) Inventors: Masaaki Isozu, Tokyo (JP); Tsugutomo Enami, Saitama (JP); Shinichi Kawano, Tokyo (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 12/688,100

(22) Filed: Jan. 15, 2010

(65) Prior Publication Data

US 2010/0185936 A1 Jul. 22, 2010

(30) Foreign Application Priority Data

Jan. 19, 2009 (JP) ................... P2009-008554

(51) Int. Cl.
*G06F 15/16* (2006.01)
(52) U.S. Cl.
USPC ........... 715/239; 715/234; 715/237; 715/240; 715/241
(58) Field of Classification Search
USPC .................. 715/200, 234, 237, 239, 240, 241
See application file for complete search history.

(56) References Cited

U.S. PATENT DOCUMENTS

| | | | | |
|---|---|---|---|---|
| 7,512,932 B2* | 3/2009 | Davidov et al. | ............... | 717/106 |
| 7,627,571 B2* | 12/2009 | Jing et al. | ............... | 1/1 |
| 7,730,104 B2* | 6/2010 | Uchiyama et al. | ............ | 707/802 |
| 7,747,657 B2* | 6/2010 | Singh | ............ | 707/803 |
| 2007/0219804 A1* | 9/2007 | Asayama | ............ | 704/275 |
| 2008/0059454 A1* | 3/2008 | Andrieu | ............ | 707/5 |
| 2008/0275910 A1* | 11/2008 | Molina-Moreno et al. | ... | 707/103 R |
| 2009/0063530 A1* | 3/2009 | Lee et al. | ............ | 707/101 |
| 2009/0157630 A1* | 6/2009 | Yuan | ............ | 707/3 |
| 2009/0222419 A1* | 9/2009 | Lam et al. | ............ | 707/3 |
| 2010/0318343 A1* | 12/2010 | Wei et al. | ............ | 703/18 |

FOREIGN PATENT DOCUMENTS

| | | |
|---|---|---|
| JP | 10-63649 | 3/1998 |
| JP | 2002-189740 | 7/2002 |
| JP | 2004-70405 | 3/2004 |
| JP | 2005-43990 | 2/2005 |
| JP | 2007-279964 | 10/2007 |

OTHER PUBLICATIONS

Nago, Katashi, Digital Content Annotation and Transcoding, 2003, Artech House Publishers, p. 25.*
Kushmerick, N., "Wrapper Induction: Efficiency and Expressiveness," Artificial Intelligence, Vo. 118, pp. 15-68, (2000).

* cited by examiner

*Primary Examiner* — Stephen Hong
*Assistant Examiner* — Gregory J Vaughn
(74) *Attorney, Agent, or Firm* — Finnegan Henderson Farabow Garrett & Dunner LLP

(57) ABSTRACT

There is provided an information processing method, including the steps of: obtaining a first format document described using a mark-up language; and generating, based on definition data defining a hierarchical relationship of at least two types of tags of the mark-up language in a document structure, a second format document representing a tree structure having at least a node thereof corresponding to the tag or to a text related to the tag from the first format document.

7 Claims, 16 Drawing Sheets

```
<html>
<head></head>
<body>
<h1>LARGE HEADING</h1>
TEXT
<h2>MIDDLE HEADING 1</h2>
<h3>SMALL HEADING 1</h3>
<h2>MIDDLE HEADING 2</h2>
<h3>SMALL HEADING 2</h3>
</body>
</html>
```

"body" > "h1" > "h2" > "h3" > "h4" > "h5" > "h6"

INFORMATION PROCESSING METHOD, INFORMATION PROCESSING APPARATUS, AND PROGRAM

BACKGROUND OF THE INVENTION

1. Field of the Invention

The present invention relates to an information processing method, an information processing apparatus, and a program.

2. Description of the Related Art

Along the popularization of the Internet, Web pages that are made public via the Internet have come to include diverse digital information. Such digital information includes both useful and useless information from the viewpoint of a user. Therefore, efforts have been made to develop a technique for automatically extracting desired information from Web pages.

For example, a technique called LR Wrapper is suggested in "Wrapper induction: efficiency and expressiveness", by Nicholas Kushmerick (Artificial Intelligence, vol. 118, pp 15-68 (2000)) to extract desired information based on a positional relationship of tags included in a HyperText Markup Language (HTML) document. According to LR Wrapper, a template of a positional relationship between tags is stored in advance, and each of Web pages is matched against the template to extract desired information. However, the LR Wrapper has a disadvantage that, because the LR Wrapper performs matching over the entire Web page, unintended information could be extracted, when the page contains information about different areas. On the other hand, Japanese Patent Application Laid-Open Nos. 2007-279964 and 2004-70405 suggest a technique for segmenting a Web page into a plurality of blocks, and matching each of the blocks against keywords.

SUMMARY OF THE INVENTION

However, digital information is not necessarily described structurally with a mark-up language that is generally used in describing a Web page. For example, because unstructured usage of tags is permitted in the HTML (e.g., omission of the end tag is permitted), items semantically having a hierarchical relationship are often simply described in parallel in a document structure. Therefore, in an attempt to extract a block describing desired information from an HTML document, HTML tags do not allow an appropriate range of a block to be easily determined. Furthermore, although the eXtensible HyperText Markup Language (XHTML) that is a subset of the eXtensible Markup Language (XML) can be used to structurally describe a Web page, it is quite probable that the HTML will remain used in the future, and it will be difficult to replace many existing HTML documents with XML or XHTML documents.

In light of the foregoing, it is desirable to provide a new and improved information processing method, information processing apparatus, and program for enabling an interpretation of a document structure described using a mark-up language typified by an HTML document and an appropriate extraction of a block therefrom.

According to an embodiment of the present invention, there is provided an information processing method, including the steps of: obtaining a first format document described using a mark-up language; and generating, based on definition data defining a hierarchical relationship of at least two types of tags of the mark-up language in a document structure, a second format document representing a tree structure having at least a node thereof corresponding to the tag or to a text related to the tag from the first format document.

The definition data may define a hierarchical relationship of at least heading-related tags out of tags used in the first format document in a document structure.

The node may include a node corresponding to a heading marked up with the tag.

The information processing method may further include a step of identifying a set of nodes that satisfy a specified extraction condition from the tree structure represented by the second format document.

The information processing method may further include a step of extracting a block corresponding to the identified set of nodes from the first format document.

The extraction condition may be a condition capable of extracting a set of nodes including and under a node corresponding to a tag marking up a heading that matches a specified extraction key.

The extraction condition may be a condition capable of extracting a set of nodes including and under a parent node of a node corresponding to a tag marking up a heading that matches a specified extraction key.

The mark-up language may be the HyperText Markup Language (HTML), and then the definition data may be data defining a hierarchical relationship of at least "h" tags of the HTML in a document structure.

According to another embodiment of the present invention, there is provided an information processing apparatus including: a document obtaining unit which obtains a first format document described using a mark-up language; and a document analyzing unit which generates, based on definition data defining a hierarchical relationship of at least two types of tags of the mark-up language in a document structure, a second format document representing a tree structure having at least a node thereof corresponding to the tag or to a text related to the tag from the first format document.

According to another embodiment of the present invention, there is provided a program that causes a computer controlling an information processing apparatus to function as: a document obtaining unit which obtains a first format document described using a mark-up language; and a document analyzing unit which generates, based on definition data defining a hierarchical relationship of at least two types of tags of the mark-up language in a document structure, a second format document representing a tree structure having at least a node thereof corresponding to the tag or to a text related to the tag from the first format document.

As described above, according to the information processing method, the information processing apparatus, and the program according to an embodiment of the present invention, the structure of a document described using a mark-up language can be interpreted, and a block can be appropriately extracted therefrom.

DETAILED DESCRIPTION OF THE EMBODIMENTS

Figure 1:
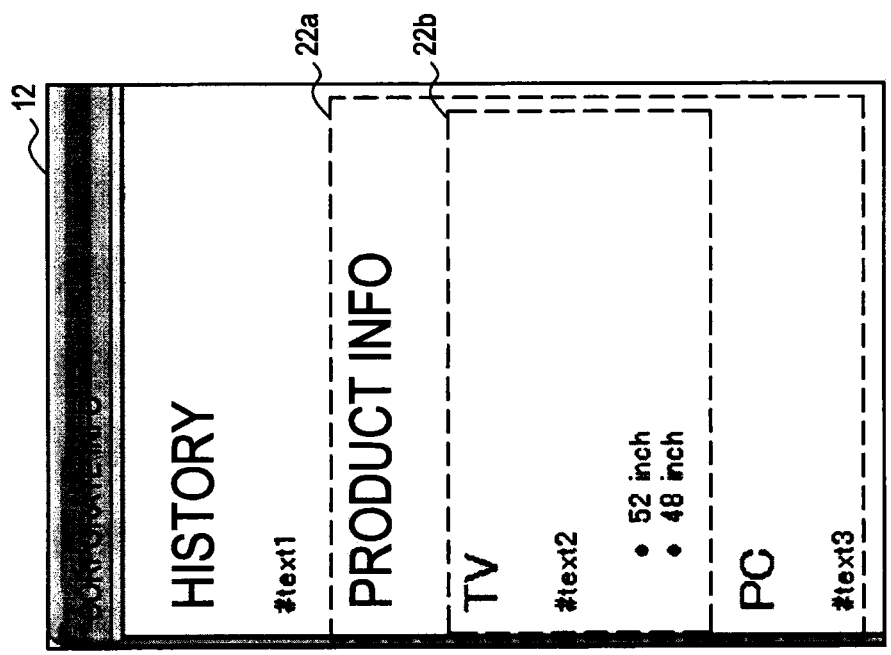
FIG. 1 is an illustrative diagram of exemplary contents of a first format document displayed through a browser.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.
1. Example of Document Handled According to Embodiment
2. Explanation of Information Processing Apparatus According to Embodiment
   2-1. Overview of Information Processing Apparatus
   2-2. Exemplary Hardware Configuration
   2-3. Exemplary Functional Configuration
3. Summary

1. Example of Document Handled According to Embodiment

FIG. 1 is an illustrative diagram of an exemplary Web browser window displaying an HTML document that is an example of a document handled according to an embodiment of the present invention. FIG. 1 shows a Web page 12 having a title bar with a title "Corporate Info".

The Web page 12 includes two large headings, "History" and "Product Info", described in large-sized characters. Under the heading "History", a character string "#text1" is indicated. Under the heading "Product Info", two middle headings, "TV" and "PC", described in medium-sized characters are indicated. Under the heading "TV", the character string "#text2" and a list of two items corresponding to sizes of the product ("52 Inch" and "48 Inch") are indicated. Under the heading "PC", a character string "#text3" is indicated.

A visitor who sees the Web page 12 can understand, for example, that the company introduced in the Web page 12 provides "TV" and "PC" as their products, and the product information is described in a window section 22a. The visitor can also understand that the product information related to the "TV" is described in a window section 22b.

Figure 2:
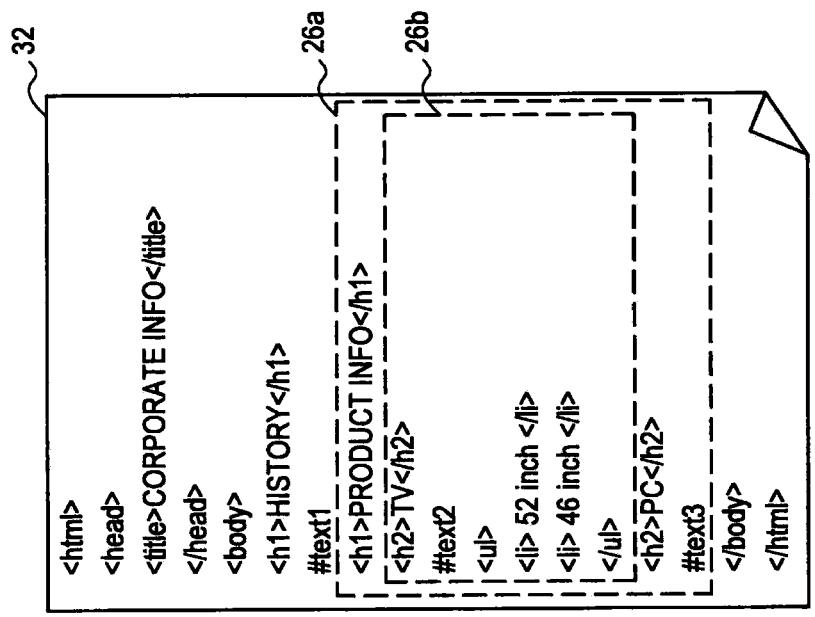
FIG. 2 is an illustrative diagram of the contents of the document shown in FIG. 1 represented in a text format.

In contrast, FIG. 2 is an illustrative diagram of the contents of the HTML document, shown in FIG. 1, represented in the text format, not through a Web browser.

FIG. 2 shows the HTML document 32 marked up with the HTML tags. The contents of the HTML document 32 are described in a nest structure, using a start tag and an end tag. A block 26a that is a part of the HTML document 32 corresponds to the window section 22a shown in FIG. 1. A block 26b corresponds to the window section 22b shown in FIG. 1.

Figure 3:
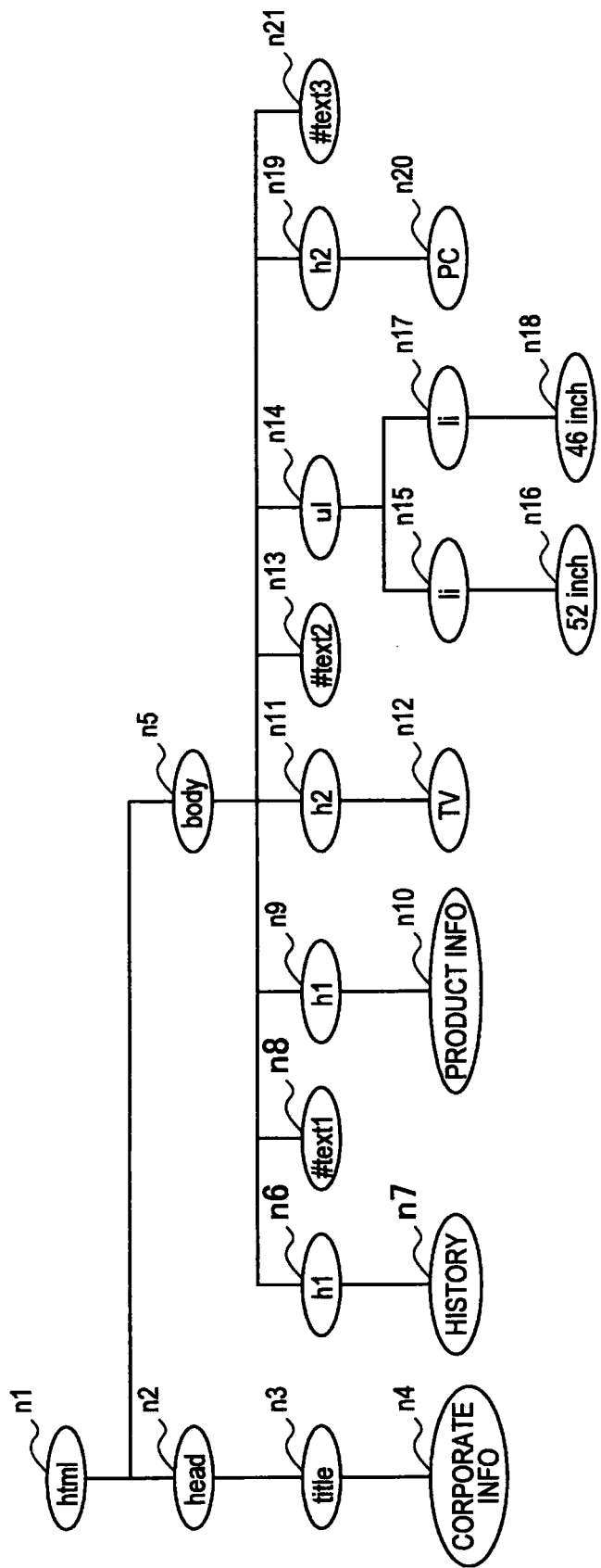
FIG. 3 is an illustrative diagram of a nested relationship of tags of the document shown in FIG. 1 in a tree structure.

FIG. 3 is an illustrative diagram of the nest structure of the HTML document 32 shown in FIG. 2, visualized as a tree structure having nodes thereof corresponding to HTML tags and texts marked up with the HTML tags.

Referring to FIG. 3, the HTML document 32 has twenty one nodes, n1 to n21. The node n2 (the "head" tag) and a node n5 (the "body" tag) are positioned under the node n1 (the "html" tag); the node n3 (the "title" tag) is positioned under the node n2; and the node n4 (the text "Corporate Info") is positioned under the node n3. There are eight nodes n6, n8, n9, n11, n13, n14, n19, and n21, positioned in parallel under the node n5. There are other lower-level nodes positioned under each of the eight nodes. Among those nodes, nodes n9 to n21 correspond to the block 26a shown in FIG. 2, and nodes n11 to n18 correspond to the block 26b shown in FIG. 2.

In an attempt to automatically obtain the product information of the company from the HTML document 32, matching can be performed with a keyword "Product Info", for example, resulting in a keyword match with the node n10, shown in FIG. 3. However, as mentioned earlier, because the nodes n9 to n21, corresponding to the product information, are only a part of the nodes n6 to n21 that are positioned in parallel, it is difficult to appropriately determine the nodes corresponding to the product information from the node n10 that is identified by the matching. In addition, the same can be said when an attempt is made to automatically obtain any other information such as that related to the product "TV" or the product "PC".

Therefore, according to an embodiment of the present invention, as will be described more in detail in the following paragraph and thereafter, a document format described using a mark-up language typified by the HTML is converted into a tree structure that is more suitable for information extraction, so that an appropriate block can be extracted more easily.

2. Explanation of Information Processing Apparatus According to Embodiment

[2-1. Overview of Information Processing Apparatus]

Figure 4:
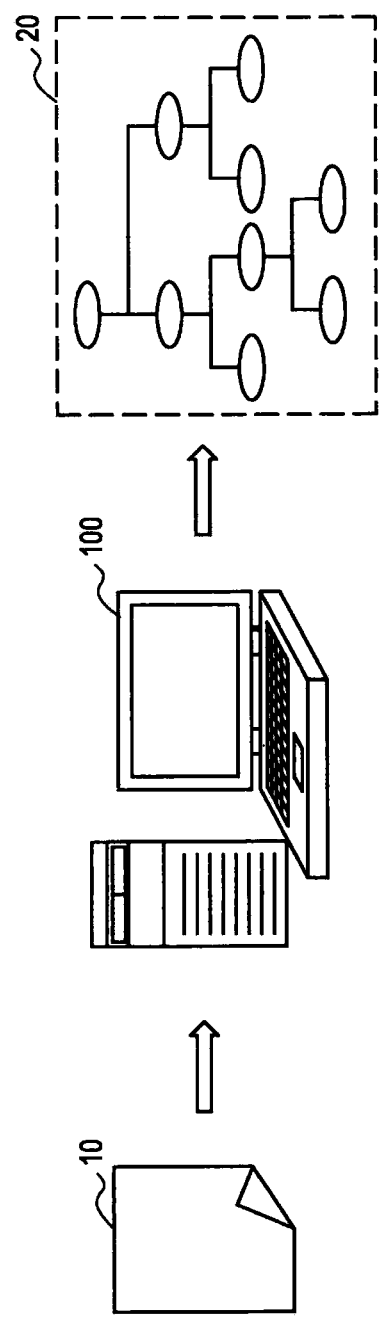
FIG. 4 is a schematic diagram showing a generalized view of an information processing apparatus according to an embodiment of the present invention.

FIG. 4 is a schematic diagram showing a generalized view of an information processing apparatus 100 according to an embodiment of the present invention.

Referring to FIG. 4, the information processing apparatus 100 receives an input of a first format document 10 described using a given type of mark-up language. The mark-up language used with the document 10 may be, for example, the Standard Generalized Markup Language (SGML), the XML that is a subset of the SGML, the HTML, or the TeX. In the document 10, a structure (a division of paragraphs, or a list, for example) and a layout of texts are specified with tags or commands marking up the texts.

After that, the information processing apparatus 100 processes the document 10 to output a second format document 20. The second format document 20 represents the contents of the document 10 in a tree structure having nodes thereof corresponding to at least tags of the mark-up language used in the document 10 and texts associated thereto. The document 20 may substantially be a set of given data that are capable of representing a tree structure. In other words, the document 20 may be, for example, a data file in the XML format, or a group of data stored in a database. The process that the information processing apparatus 100 performs to convert the document 10 into the document 20 will be described later in detail.

The information processing apparatus 100 may be, for example, a general-purpose computer such as a personal computer (PC) or a work station like the one shown in FIG. 4. The information processing apparatus 100 may also be, for example, a terminal device such as a mobile information terminal or a mobile telephone, or a home appliance such as a television receiver. Furthermore, the information processing apparatus 100 may also be, for example, a server that provides services to a terminal device over a network.

[2-2. Exemplary Hardware Configuration]

Figure 5:
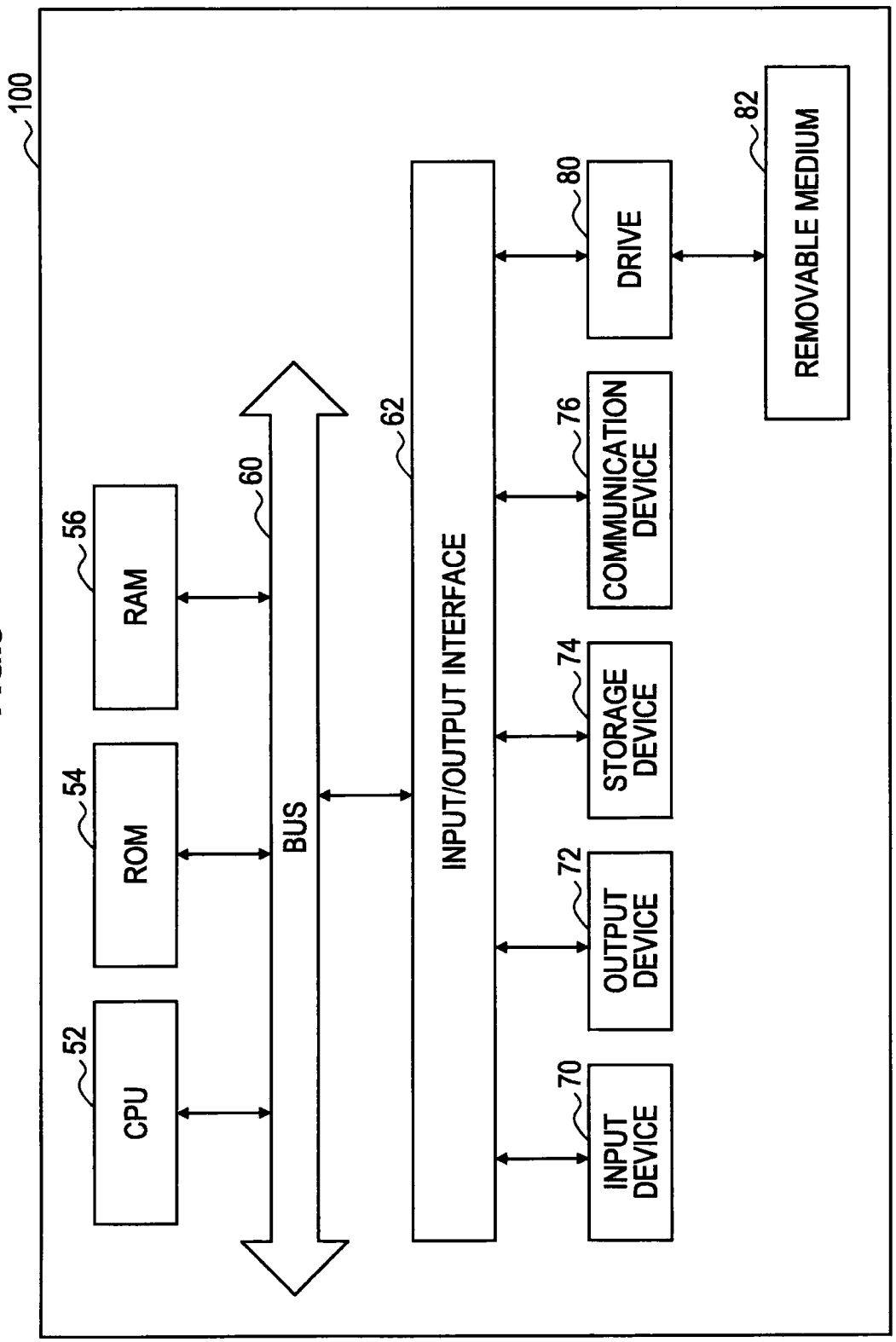
FIG. 5 is a block diagram of a hardware configuration of the information processing apparatus according to the embodiment.

FIG. 5 is a block diagram showing an exemplary hardware configuration of the information processing apparatus 100. In FIG. 5, a central processing unit (CPU) 52 controls overall operations of the information processing apparatus 100. A read-only memory (ROM) 54 stores therein computer programs describing a part of or entire process sequence, or data. The random-access memory (RAM) 56 temporarily stores therein programs and data that the CPU 52 utilizes upon executing processes.

The CPU 52, the ROM 54, and the RAM 56 are connected to each other via a bus 60. An input/output interface 62 is also connected to the bus 60. The input/output interface 62 is an interface for connecting the CPU 52, the ROM 54, and the RAM 56 to an input device 70, an output device 72, a storage device 74, a communication device 76, and a drive 80.

The input device 70 receives an instruction from a user, or an input of information via an input device such as a mouse, a keyboard, a touch panel, a button, or a switch. The output device 72 outputs information to a user via a display device such as a cathode ray tube (CRT) display, a liquid crystal display, or an organic light emitting diode (OLED) display, or an audio output device such as a speaker.

The storage device 74 is, for example, a hard disk drive or a flash memory storing therein programs or data. The communication device 76 performs communication processes over a network such as a local area network (LAN) or the Internet. The drive 80 is provided in a general-purpose computer as required, and a removable medium 82, for example, is mounted thereto.

[2-3. Exemplary Functional Configuration]

Figure 6:
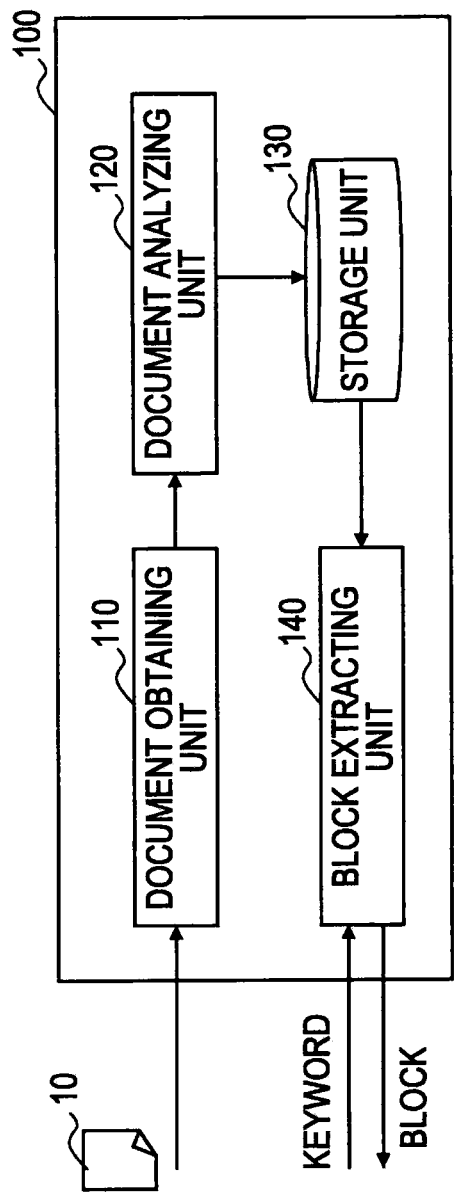
FIG. 6 is a block diagram of a logical configuration of the information processing apparatus according to the embodiment.

FIG. 6 is a block diagram of an exemplary arrangement of logical functions included in the information processing apparatus 100. Referring to FIG. 6, the information processing apparatus 100 includes a document obtaining unit 110, a document analyzing unit 120, a storage unit 130, and a block extracting unit 140.

[2-3-1. Obtaining and Analyzing Document]

The document obtaining unit 110 obtains a first format document described using a mark-up language. The first format document may be, for example, created by a user using the input device 70 shown in FIG. 5, and input to the document obtaining unit 110. Alternatively, the document obtaining unit 110 may obtain the first format document from the storage device 74 or the removable medium 82 shown in FIG. 5, or another device connected via the communication device 76.

As mentioned earlier, the first format document is a document described in a given type of mark-up language such as the SGML, the XML, the HTML, or the TeX. Upon receiving the first format document, the document obtaining unit 110 generates a tree structure representing a nested relationship of tags (including commands hereinafter), for example, in a tree-like format. Such a process can be performed by a known HTML parser if the first format document is an HTML document. Hereinafter, the tree structure, which the document obtaining unit 110 generates correspondingly to a nested relationship of tags, will be referred to as a first tree structure. According to this embodiment, after the document obtaining unit 110 generates the first tree structure from the first format document, the document analyzing unit 120, which is to be described later, generates a second tree structure from the first tree structure. Alternatively, according to another embodiment, generation of the first tree structure, performed by the document obtaining unit 110, for example, may be omitted.

The document analyzing unit 120 generates a second format document from the first format document based on definition data defining a hierarchical relationship of at least two types of tags of a mark-up language in a document structure to enable an appropriate block to be extracted easily. The second format document corresponds to the document 20 described with reference to FIG. 4, and is capable of representing the second tree structure having the node thereof corresponding to at least tags and texts related to the tags.

The definition data used by the document analyzing unit 120 may be, for example, data defining a hierarchical relationship of at least the tags associated to headings, out of the tags used in the first format document, in a document structure. The tags associated to heading may be, for example, the "h" tags in the HTML.

Figure 7:
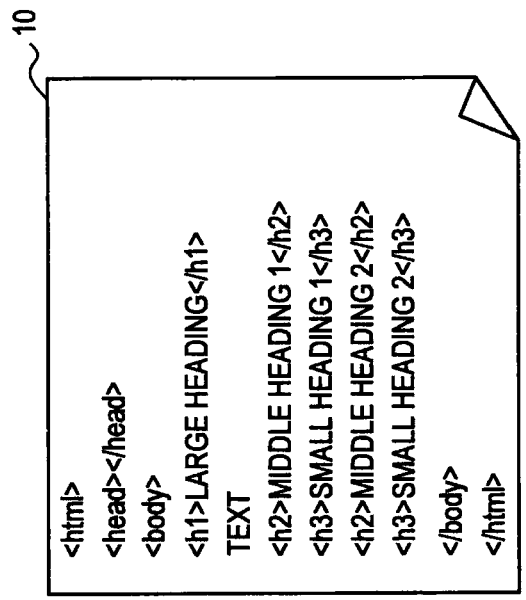
FIG. 7 is an illustrative diagram of an exemplary first format document in which "h" tags are used.
Figure 8:
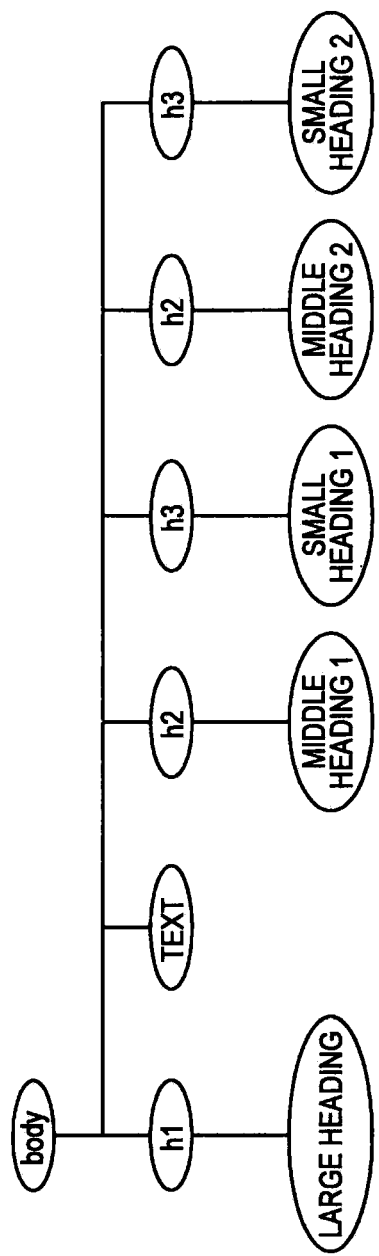
FIG. 8 is an illustrative diagram showing a nested relationship of tags included in the document shown in FIG. 7 in a tree structure.
Figure 9:
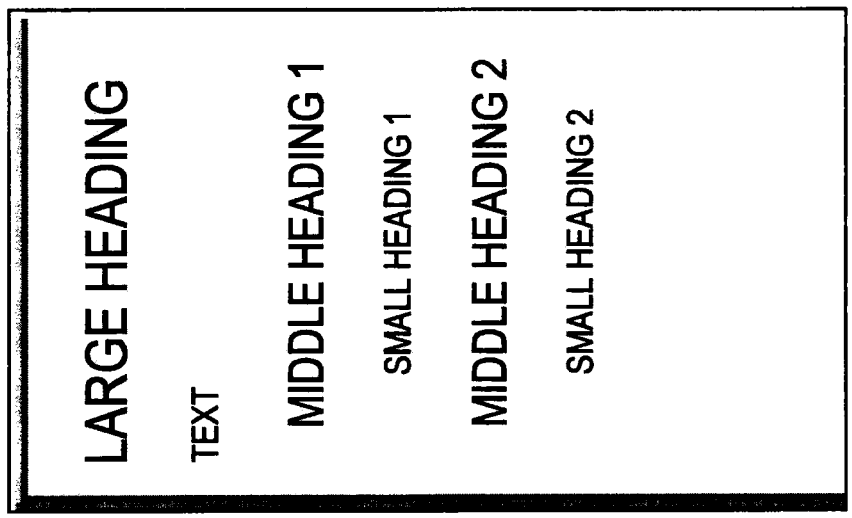
FIG. 9 is an illustrative diagram of the contents of the document shown in FIG. 7 displayed through a browser.

FIGS. 7 to 9 are illustrative diagrams for explaining the hierarchical relationship related to the "h" tags in a document structure.

To start with, FIG. 7 shows an example of the first format document 10 described with tags "h1", "h2", and "h3". In FIG. 7, the "body" section of the document 10 includes one large heading marked up with the "h1" tags, a text under the large heading, two middle headings marked up with the "h2" tags, and two small headings marked up with the "h3" tags.

FIG. 8 shows a part of the first tree structure obtained by parsing the document 10 shown in FIG. 7 with an HTML parser and corresponding to the section under the "body" tag. In FIG. 8, the tag nodes corresponding to the three types of "h" tags, the "h1", the "h2", and the "h3", and the node corresponding to the "Text" are arranged in parallel, at a level under the "body" tag. Under each node of the "h" tags, nodes of character strings corresponding to the headings marked up with each of the "h" tags, are arranged.

FIG. 9 shows an exemplary representation of the document 10 shown in FIG. 7, shown through a Web browser. Referring to FIG. 9, one can understand that "Large Heading" includes the "Text" and all other headings within the scope thereof. In the similar manner, it can also be understood that the "Middle Heading 1" includes the "Small Heading 1", and the "Middle Heading 2" includes the "Small Heading 2", respectively, within the scopes thereof. In other words, even when the "h" tags defined in the HTML are used in parallel as in the first tree structure shown in FIG. 8, the including/included relationship of marked-up texts in a document structure, that is, a hierarchical relationship thereof is at least visually represented. According to this embodiment, definition data are provided to define a hierarchical relationship in a document structure for the "h" tags shown as an example in FIG. 10.

Figure 10:
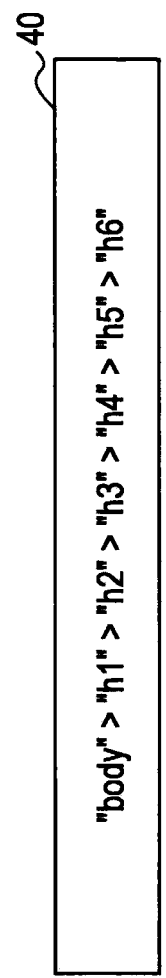
FIG. 10 is an illustrative diagram of an exemplary definition data defining a hierarchical relationship of tags.

Referring to FIG. 10, definition data 40 defines hierarchical relationships of "h" tags as "body">"h1">"h2">"h3">"h4">"h5">"h6". An inequality sign (">") included in the definition data 40 indicates that a tag at left is positioned at a higher level than a tag at right. In the definition data 40, the hierarchical relationships of the "h" tags, from "h1" to "h6", are defined in the order of the numbers thereof, and the "body" tag is defined at a higher level than all of these "h" tags. Such definition data are stored in advance, for example, in the storage unit 130 shown in FIG. 6. The document analyzing unit 120 uses the definition data 40 to generate the second format document from the first format document.

The definition data are not limited to those defining a hierarchical relationship of the "body" tag and the "h" tags in a document structure. For example, tags whose hierarchical relationship defined by the definition data may include "font" tags that specify a font size of a text in the HTML. Moreover, tags whose hierarchical relationship defined by the definition data may also include any other tags such as those for specifying a certain class that is specified in a style sheet using an attribute.

Figure 11:
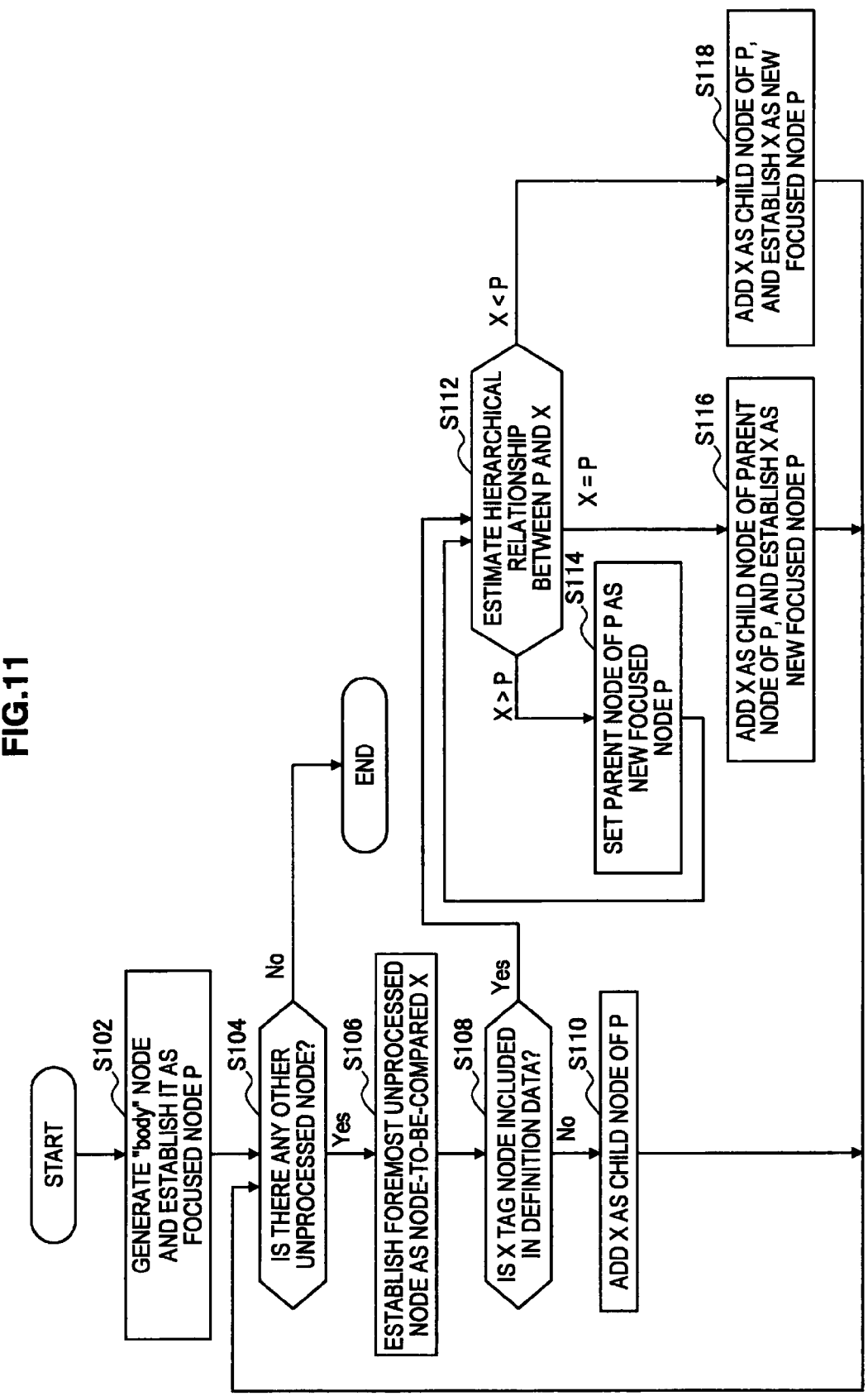
FIG. 11 is a flowchart of an exemplary document analyzing process according to the embodiment.

FIG. 11 is a flowchart of an exemplary document analyzing process performed by the document analyzing unit 120.

Referring to FIG. 11, the document analyzing unit 120 generates a "body" node corresponding to the "body" tag, and makes the "body" node a start node of the second tree structure. The document analyzing unit 120 then sets a focus of the process on the "body" node, that is, establishes the "body" node as focused node P.

The document analyzing unit 120 then determines if there are any other remaining nodes that have not processed in the first tree structure (S104). If there is any unprocessed node, the process proceeds to S106. If there is no unprocessed node, the process is ended.

At S106, out of the remaining nodes that have not processed in the first tree structure, the document analyzing unit 120 establishes the foremost node as a node-to-be-compared X (S106). The foremost node herein may be the node corresponding to the first tag or the first text described in the first format document. Alternatively, the foremost node may be the node that is referred at first in a depth-first search, for example, performed in the first tree structure. For example, in the first tree structure shown in FIG. 8, when the process is finished up to the "body" node, the "h1" node will be the foremost node out of all other unprocessed nodes. When the process is finished up to the "h1" node, the "Large Heading" node will be the foremost node out of all other unprocessed nodes.

Then, the document analyzing unit 120 determines if the node-to-be-compared X is a tag node that corresponds to a tag whose hierarchical relationship in a document structure is defined in the definition data (S108). For example, if the definition data 40 shown in FIG. 10 are defined and the node-to-be-compared X corresponds to the "body" tag or any one of the "h" tags, "h1" to "h6", the process proceeds to S112. On the contrary, if the node-to-be-compared X is a node other than those mentioned above (e.g., a node corresponding to a heading string marked up with tags, or a text), the process proceeds to S110.

At S110, the node-to-be-compared X, which is established at S106, is added as a child node of the focused node P (S110). For example, if the focused node P is the "h1" node in the first tree structure shown in FIG. 8, and the node-to-be-compared X is the "Text" node, the "Text" node is added under the "h1" node in the second tree structure. If the focused node P is the "h2" node in the first tree structure shown in FIG. 8, and the node-to-be-compared X is the "Middle Heading 1" node, the "Middle Heading 1" node is added under the "h2" node in the second tree structure. Subsequently, the system control returns to S104, and it is determined again if there are still any other unprocessed nodes.

On the contrary, if the node-to-be-compared X is a tag node corresponding to a tag whose hierarchical relationship in a document structure is defined, the hierarchical relationship thereof is compared against that of the focused node P (S112). For example, if the definition data 40 shown in FIG. 10 are defined, the focused node P is a "body" node, and the node-to-be-compared node X is a tag node corresponding to an "h" tag, it is determined that the node-to-be-compared X<the focused node P. If the focused node P is the "h1" node, and the node-to-be-compared X is also the "h1" node, the node-to-be-compared X=the focused node P is established. If the focused node P is the "h2" node, and the node-to-be-compared X is the "h1" node, it is determined that the node-to-be-compared X>the focused node P. In this context, if the node-to-be-compared X>the focused node P, the process proceeds to S114. If the node-to-be-compared X=the focused node P, the process proceeds to S116. If the node-to-be-compared X<the focused node P, the process proceeds to S118.

If the node-to-be-compared X>the focused node P, the parent node of the focused node P is established as a new focused node P at S114 (S114). For example, if the focused node P is the first "h3" node in the first tree structure shown in FIG. 8, and the node-to-be-compared X is the second "h2" node, the focused node P is reset to the first "h2" node that is the parent node of the first "h3" node. Then, the process control returns to S112, and the hierarchical relationship thereof is compared again against that of the node-to-be-compared X.

If the node-to-be-compared X=the focused node P, the node-to-be-compared X is added as a child node of the parent node of the focused node P (that is, as a brother node) in the second tree structure at S116. For example, if the focused node P is the first "h2" node in the first tree structure shown in FIG. 8, and the node-to-be-compared X is the second "h2" node, the second "h2" node is added as a child node of the "h1" node that is the parent node of the first "h2" node. The added second "h2" node is then established as a new focused node P. The system control returns to S104, and it is determined again if any other unprocessed nodes are still present.

If the node-to-be-compared X<the focused node P, the node-to-be-compared X is added as a childe node of the focused node P in the second tree structure at S118. For example, if the focused node P is the first "h2" node in the first tree structure shown in FIG. 8, and the node-to-be-compared X is the first "h3" node, the "h3" node is added as a child node of the first "h2" node. The added "h3" node is then established as a new focused node P. Subsequently, the system control returns to S104, and it is determined again if there are still any other unprocessed nodes.

Figure 12:
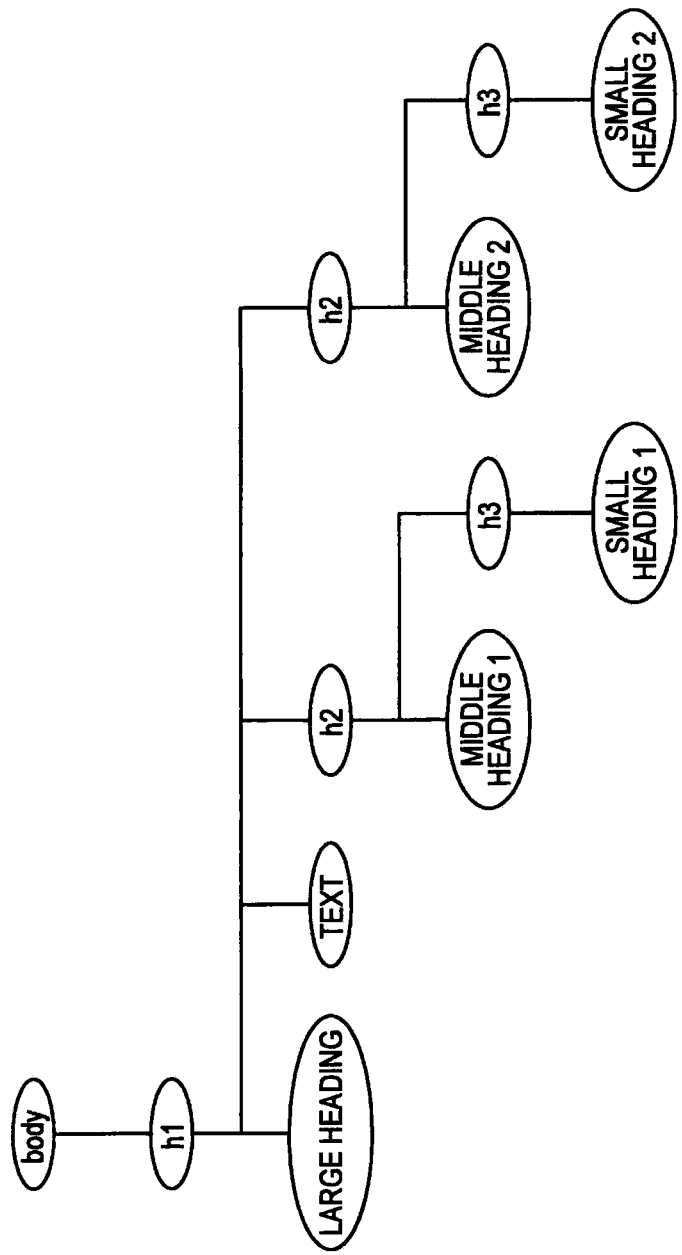
FIG. 12 is an illustrative diagram of an exemplary second format document output from a document analyzing unit.

As a result of the document analyzing process performed by the document analyzing unit 120, the second format document, representing the second tree structures shown in FIG. 12, is generated from the first tree structure whose one example is shown in FIG. 8.

Referring to FIG. 12, the "h1" node is positioned at one level under the "body" node, and the "Large Heading" node, the "Text" node, the first "h2" node, and the second "h2" node are positioned at one level under the "h1" node. Furthermore, the "Middle Heading 1" node and the "Middle Heading 2"

node, and each of the "h3" nodes are respectively arranged one level under the "h2" nodes. Moreover, the "Small Heading 1" node and the "Small Heading 2" node are arranged, respectively, under the "h3" nodes. The second tree structure corresponds to including/included relationships of the document structure of the document 10 visually represented in FIG. 9. The document analyzing unit 120 outputs the second format document corresponding to such a second tree structure to the storage unit 130, as a data file in an XML format, or a set of data to be stored in a database.

In addition, according to the embodiment, the document analyzing unit 120 outputs a list of heading strings, which are to be used in a block extracting process performed by the block extracting unit 140 to be described later, to the storage unit 130. For example, there are five heading strings in FIG. 12: the "Large Heading", the "Middle Heading 1", the "Small Heading 1", the "Middle Heading 2", and the "Small Heading 2". In the list of heading strings output from the document analyzing unit 120, a pointer to a node corresponding to a heading string is maintained correspondingly to each of the heading strings.

The storage unit 130 includes, for example, the storage device 74 described earlier with reference to FIG. 5, and stores therein the second format document, and the list of heading strings, each of which is output from the document analyzing unit 120.

[2-3-2. Extracting Block]

The block extracting unit 140 identifies a set of nodes that satisfies an extraction condition designated by a user, for example, in the second tree structure represented by the second format document. The block extracting unit 140 then extracts the block corresponding to the identified set of nodes from the first format document.

(Exemplary Extraction Condition 1)

An extraction condition may be, for example, a condition that is capable of extracting a set of nodes including and under a tag node corresponding to a tag marking up a heading that matches a specified extraction key (a keyword for extraction). Such an extraction condition is hereinafter referred to as an exemplary extraction condition 1.

Figure 13:
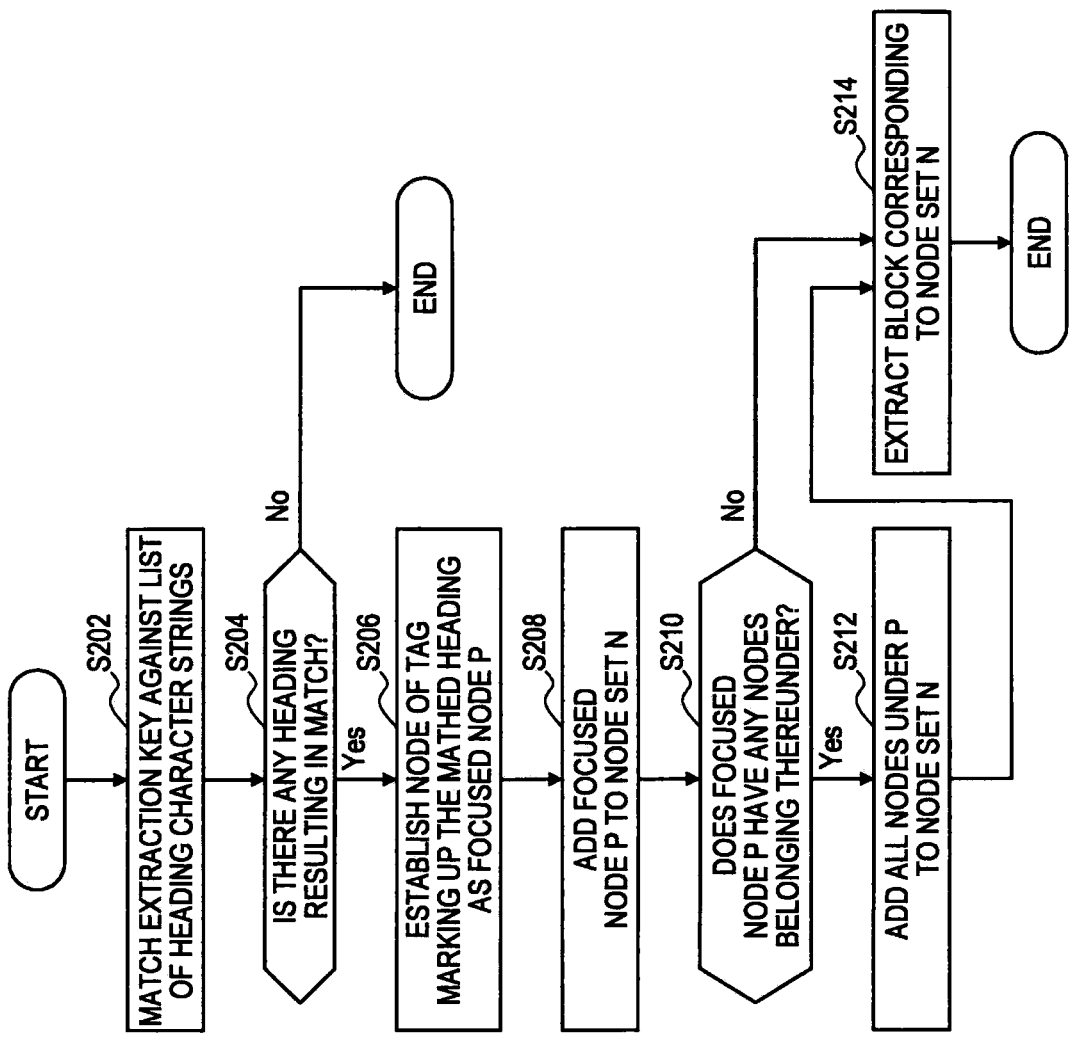
FIG. 13 is a flowchart of an exemplary block extracting process according to the embodiment.

FIG. 13 is a flowchart of an exemplary block extracting process performed by the block extracting unit 140 using the exemplary extraction condition 1.

Referring to FIG. 13, to begin with, the block extracting unit 140 matches the extraction key entered by a user, for example, against the list of heading strings stored in the storage unit 130 (S202). In the matching, any matching criteria may be used, for example, full match, partial match, or fuzzy search.

The block extracting unit 140 determines, as a result of the matching, if there is any heading that matches the extraction key (S204). If there is no heading that matches the extraction key, the process is ended. If there is any heading that matches the extraction key, the process proceeds to S206.

At S206, the tag node marking up the heading that matches the extraction key is established as a focused node P (S206). More specifically, the block extracting unit 140 obtains the pointer pointing to the node corresponding to the heading that matches the exaction key from the list of heading strings. The tag node that is the parent node of the heading node pointed by the obtained pointer is established as a focused node P. For example, if the extraction key matches the character string in the "Middle Heading 1" shown in FIG. 12, the first "h2" node, which is the parent node of the "Middle Heading 1" node, is established as a focused node P.

The focused node P is then added to a variable N that maintains a set of nodes (S208). The block extracting unit 140 further determines if the focused node P has any nodes belonging thereunder (S210). If the focused node P has a node belonging thereunder, the process proceeds to S212. If the focused node P does not have any node belonging thereunder, the system control skips S212, and proceeds to S214.

At S212, every node belonging to the levels under the focused node P (child nodes and grandchild nodes, if any, of the focused node P are added to the node set N (S212). For example, if the first "h2" node in FIG. 12 is the focused node P, each of the "Middle Heading 1" node, the first "h3" node, and the "Small Heading 1" node is added to the node set N. These nodes, maintained in the node set N at this point in time, will be those identified by the block extracting unit 140 as the nodes satisfying the specified extraction condition.

The block extracting unit 140 then extracts a block corresponding to the identified node set N from the associated document 10 having the first format (S214). Subsequently, the block extracting process is ended.

The exemplary extraction condition 1 may be provided with an additional condition, for example, to limit the type of nodes (e.g., a specific type of tag node) or the number of nodes to be extracted. For example, to limit the type of nodes to the tag nodes corresponding to the tags "h1" and "h2", the heading having an "h1" node or an "h2" node as its parent node may only be presented to the matching at S202 in the flowchart shown in FIG. 13. Alternatively, only the "h1" and "h2" nodes may be added to the node set N, out of the nodes belonging to the levels under the focused node P at S212. In this scenario, a specifier specifying a node type (e.g., "h1 or h2") will be entered by a user, in addition to the character string for the extraction key.

Figure 14:
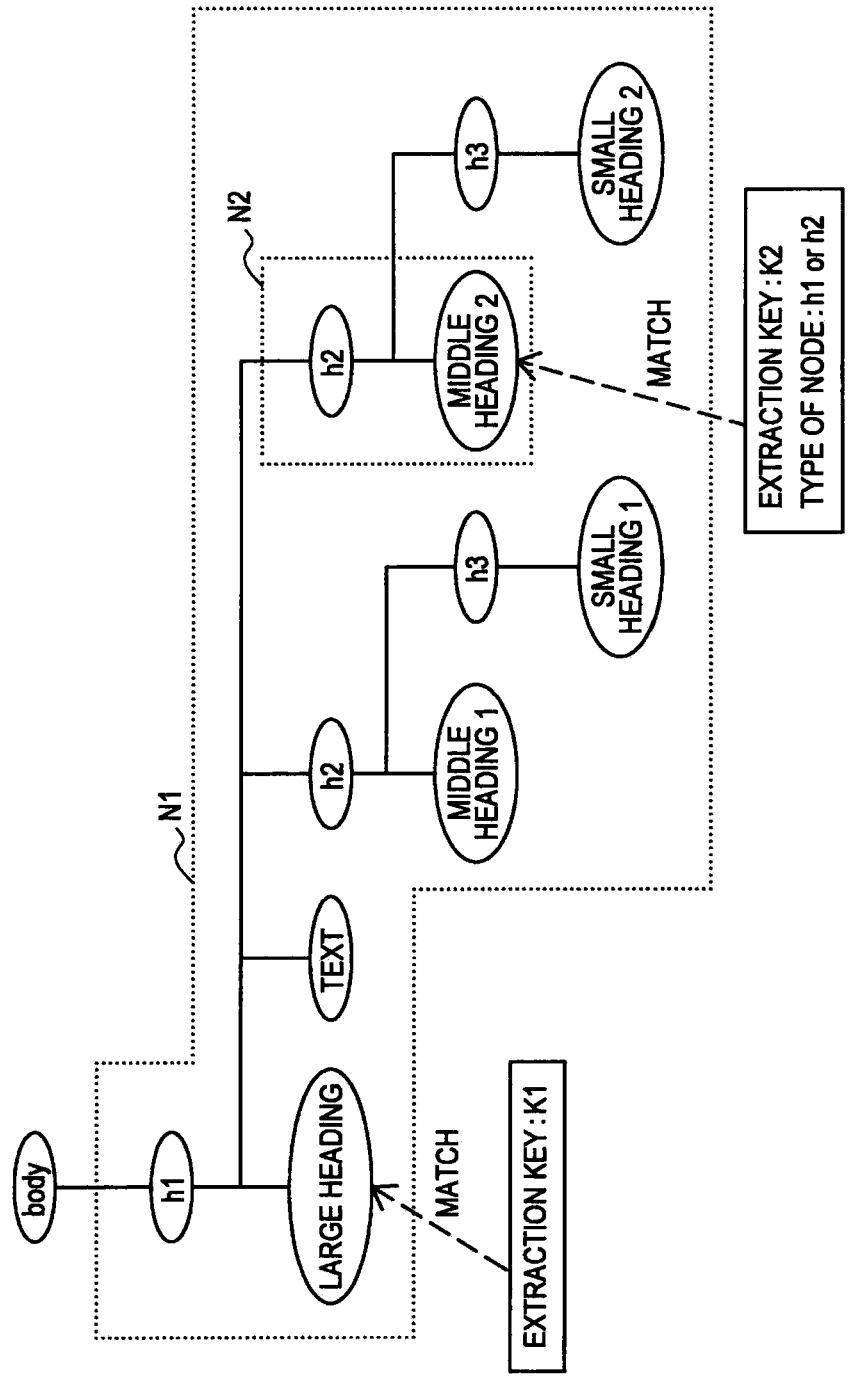
FIG. 14 is an illustrative diagram showing an exemplary set of nodes identified by the block extracting process shown in FIG. 13.
Figure 15:
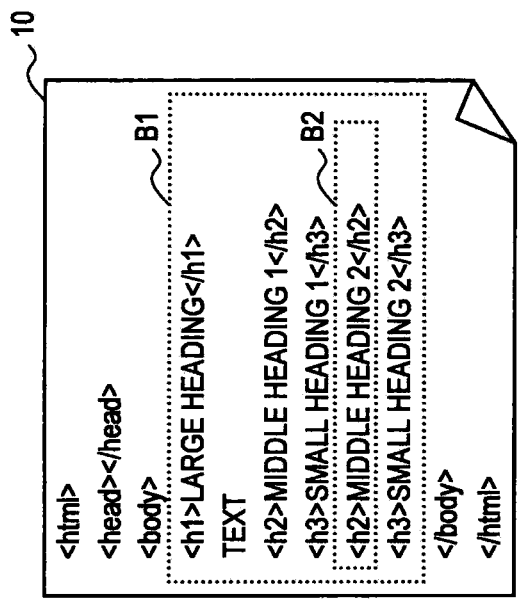
FIG. 15 is an illustrative diagram showing examples of blocks extracted by the block extracting process shown in FIG. 13.

FIGS. 14 and 15 are illustrative diagrams for explaining an example of a block extracted by way of the exemplary extraction condition 1.

FIG. 14 shows, again, the exemplary second tree structure represented by the second format document described earlier with reference to FIG. 12. In such a second tree structure, it is assumed herein that an extraction key K1 entered by a user matches the heading string "Large Heading". In this situation, the block extracting unit 140 identifies a node set N1 including the "h1" node, which is the parent node of the "Large Heading" node, and the nodes belonging to the levels thereunder. The block extracting unit 140 then extracts a block B1, shown in FIG. 15, corresponding to the identified node set N1, from the first format document.

In addition, it is assumed herein that, an extraction key K2 entered by a user matches the heading string "Middle Heading 2" in the second tree structure, and that a user enters an additional condition "h1 or h2" to limit the node types. In this scenario, the block extracting unit 140 identifies a node set N2 including the second "h2" node, which is the parent node of the "Middle Heading 2", and the "Middle Heading 2" node belonging to one level thereunder. The block extracting unit 140 then extracts a block B2, shown in FIG. 15, corresponding to the identified node set N2, from the first format document.

In order to automatically collect product information of a company from a Web page as an exemplary application of the exemplary extraction condition 1, a user can specify an extraction key "Product Info" to extract a block that appropriately includes contents under the heading of "Product Info". For example, a block 26a shown in FIG. 2, is an example of such a block. It is needless to say that a block extracted by utilizing the information processing apparatus 100 according to the embodiment of the present invention is not limited to a block corresponding to production information of a company.

(Exemplary Extraction Condition 2)

The extraction condition may be, for example, a condition that is capable of extracting a set of nodes including and under a parent node of a tag node corresponding to a tag marking up a heading that matches a specified extraction key (referred to as exemplary extraction condition 2, hereinafter).

Figure 16:
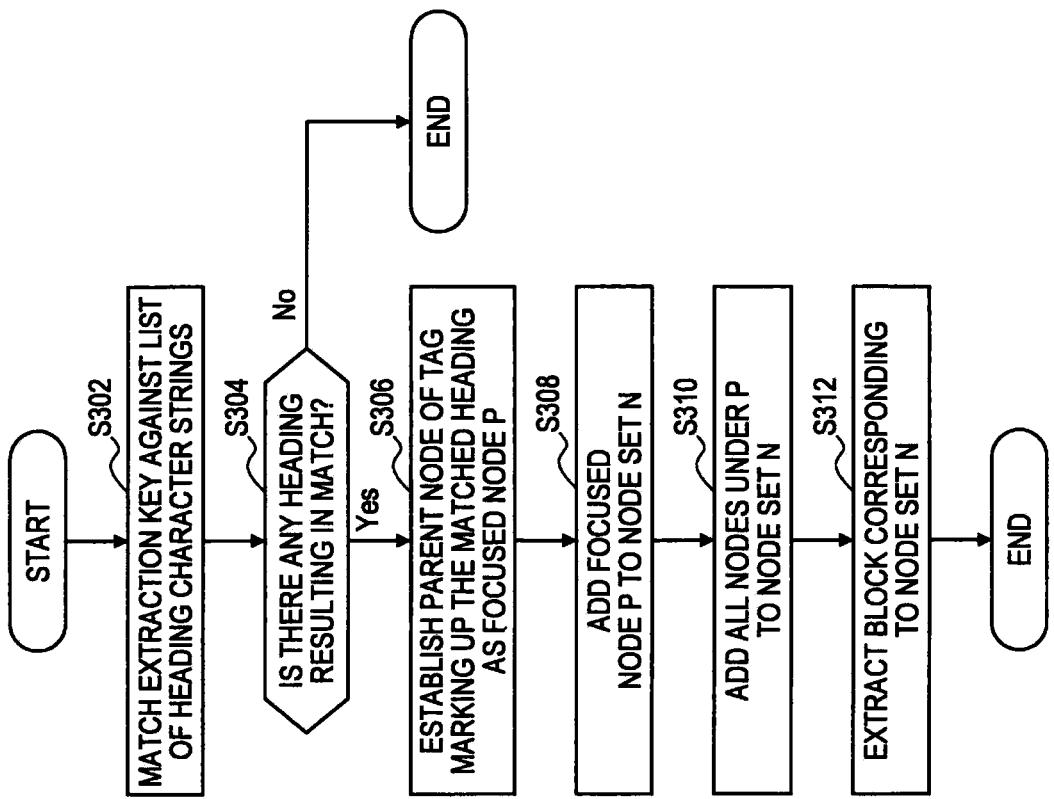
FIG. 16 is a flowchart of another exemplary block extracting process according to the embodiment.

FIG. 16 is a flowchart of another example of the block extracting process performed by the block extracting unit 140 using the exemplary extraction condition 2.

Referring to FIG. 16, to begin with, the block extracting unit 140 matches an extraction key entered by a user, for example, against the list of heading strings stored in the storage unit 130 (S302). In the matching, any matching criteria may be used, for example, full match, partial match, or fuzzy search, in the same manner as for the exemplary extraction condition 1.

The block extracting unit 140 determines, as a result of extraction, if there is any heading that matches the extraction key (S304). If there is no heading that matches the extraction key, the process is ended. If there is any heading that matches the extraction key, the process proceeds to S306.

At S306, the parent node of the tag node marking up the heading that matches the extraction key is established as a focused node P (S306). More specifically, the block extracting unit 140 obtains the pointer pointing to the node corresponding to the heading that matches the exaction key from the list of heading strings. The parent node of the tag node that is the parent node of the heading node pointed by the obtained pointer is established as a focused node P. For example, if the extraction key matches the character string in the "Middle Heading 1" shown in FIG. 12, the parent node "h1" of the first "h2" node that is the parent node of the "Middle Heading 1" node, is established as a focused node P.

The focused node P is then added to the variable N that maintains a set of nodes (S308). Furthermore, every node belonging to the levels under the focused node P is also added to the node set N (S310). These nodes, maintained in the node set N at this point in time, will be those identified by the block extracting unit 140 as the nodes satisfying the specified extraction condition.

The block extracting unit 140 then extracts a block corresponding to the identified node set N from the associated document 10 having the first format (S312). Subsequently, the block extracting process is ended. The exemplary extraction condition 2 may also be given an additional condition, for example, to limit the type of nodes or the number of nodes to be extracted.

To automatically collect product information of a company from a Web page as an exemplary application of the exemplary extraction condition 2, a user can specify an extraction key corresponding to a product type or a specific product name to extract a block described with a heading similar to the product information from a Web page. For example, by using an extraction key "TV", the block 26a describing the product information can be extracted from the HTML document 32 shown in FIG. 2.

The exemplary block extracting process described herein matches an extraction key against a heading string; however, an extraction key may also be matched against a character string other than a heading string (e.g., a text).

3. Summary

The information processing apparatus 100 according to an embodiment of the present invention is described above with reference to FIGS. 4 to 16. According to the present embodiment, a second format document, representing a tree structure having node thereof corresponding to tags and texts relating to the tags, is generated from a first format document described using a mark-up language based on predetermined definition data. Such definition data define a hierarchical relationship of at least two types of tags of the mark-up language in a document structure. In this manner, data having a tree structure, reflecting the hierarchical relationship in the document structure and being visually understandable, are made available, allowing an appropriate block to be easily extracted from a Web page, for example, so that desired information can be collected. In other words, in the HTML document 32 shown in FIG. 2, for example, a user can specify an extraction key "Product Info" to extract the block 26a, and apply the LR Wrapper to the block 26a to automatically create a database of data included in the block.

It should be understood by those skilled in the art that various modifications, combinations, sub-combinations and alterations may occur depending on design requirements and other factors insofar as they are within the scope of the appended claims or the equivalents thereof.

For example, a series of processes described with reference to FIGS. 11, 13, and 16 may not be executed in the order described in the flowcharts. Each of processing steps may include processes executed in parallel, or individually and independently.

The present application contains subject matter related to that disclosed in Japanese Priority Patent Application JP 2009-008554 filed in the Japan Patent Office on Jan. 19, 2009, the entire content of which is hereby incorporated by reference.

What is claimed is:

1. An information processing method, comprising the steps of:
obtaining a first format document described using a mark-up language including tags of at least two levels;
generating, based on definition data defining a hierarchical relationship of the tags of the mark-up language in a document structure where the tags are lined up according to their respective levels, a second format document representing a tree structure having at least one node thereof corresponding to one of the tags or to a text related to one of the tags from the first format document, wherein a node corresponding to a tag of a higher level is located in parallel and to the left of a node corresponding to a tag of a lower level, wherein the definition data defines a hierarchical relationship of at least heading-related tags out of tags used in the first format document in the document structure; wherein the at least one node includes a node corresponding to a tag marking up a heading; and
identifying a set of nodes that satisfy a specified extraction condition from the tree structure represented by the second format document.

2. The information processing method according to claim 1, further comprising a step of extracting a block corresponding to the identified set of nodes from the first format document.

3. The information processing method according to claim 1, wherein the extraction condition is a condition capable of extracting a set of nodes including and under the node corresponding to a tag marking up a heading that matches a specified extraction key.

4. The information processing method according to claim 1, wherein the extraction condition is a condition capable of extracting a set of nodes including and under a parent node of the node corresponding to a tag marking up a heading that matches a specified extraction key.

5. The information processing method according to claim 1, wherein
the mark-up language is the HyperText Markup Language (HTML), and
the definition data are data defining a hierarchical relationship of at least "h" tags of the HTML in a document structure.

6. An information processing apparatus comprising:
a processor, configured to:
obtain a first format document described using a mark-up language including tags of at least two levels; and
generate, based on definition data defining a hierarchical relationship of the tags of the mark-up language in a document structure where the tags are lined up according to their respective levels, a second format document representing a tree structure having at least a node thereof corresponding to one of the tags or to a text related to one of the tags from the first format document, wherein a node corresponding to a tag of a higher level is located in parallel and to the left of a node corresponding to a tag of a lower level, wherein the definition data defines a hierarchical relationship of at least heading-related tags out of tags used in the first format document in the document structure; wherein the at least one node includes a node corresponding to a tag marking up a heading; and
identify a set of nodes that satisfy a specified extraction condition from the tree structure represented by the second format document.

7. A non-transitory computer-readable medium having a program stored thereon that causes a computer controlling an information processing apparatus to:
obtain a first format document described using a mark-up language including tags of at least two levels;
generate, based on definition data defining a hierarchical relationship of the tags of the mark-up language in a document structure where the tags are lined up according to their respective levels, a second format document representing a tree structure having at least a node thereof corresponding to one of the tags or to a text related to one of the tags from the first format document, wherein a node corresponding to a tag of a higher level is located in parallel and to the left of a node corresponding to a tag of a lower level, wherein the definition data defines a hierarchical relationship of at least heading-related tags out of tags used in the first format document in the document structure; wherein the at least one node includes a node corresponding to a tag marking up a heading; and
identify a set of nodes that satisfy a specified extraction condition from the tree structure represented by the second format document.

\* \* \* \* \*